US008320684B2

(12) United States Patent
Son

(10) Patent No.: US 8,320,684 B2
(45) Date of Patent: Nov. 27, 2012

(54) IMAGE COMPRESSING APPARATUS, IMAGE COMPRESSING METHOD AND PROGRAM

(75) Inventor: Sho Son, Hyogo (JP)

(73) Assignee: Ricoh Company, Ltd., Tokyo (JP)

(*) Notice: Subject to any disclaimer, the term of this patent is extended or adjusted under 35 U.S.C. 154(b) by 1251 days.

(21) Appl. No.: 11/716,590

(22) Filed: Mar. 12, 2007

(65) Prior Publication Data

US 2007/0217698 A1 Sep. 20, 2007

(30) Foreign Application Priority Data

Mar. 15, 2006 (JP) ................................. 2006-070526

(51) Int. Cl.
*G06K 9/36* (2006.01)
(52) U.S. Cl. ........................................................ 382/232
(58) Field of Classification Search ........................ None
See application file for complete search history.

(56) References Cited

U.S. PATENT DOCUMENTS

| | | | | |
|---|---|---|---|---|
| 5,048,111 A * | 9/1991 | Jones et al. | ................... | 382/248 |
| 6,141,433 A * | 10/2000 | Moed et al. | ................... | 382/103 |
| 6,259,819 B1 * | 7/2001 | Andrew et al. | ............... | 382/248 |
| 6,496,607 B1 * | 12/2002 | Krishnamurthy et al. | .... | 382/282 |
| 6,801,665 B1 * | 10/2004 | Atsumi et al. | ................. | 382/239 |
| 6,853,466 B1 * | 2/2005 | Harada et al. | ................... | 358/1.9 |
| 6,879,727 B2 * | 4/2005 | Sato et al. | ...................... | 382/239 |
| 6,891,973 B1 * | 5/2005 | Atsumi et al. | ................. | 382/232 |
| 6,917,384 B1 * | 7/2005 | Fukushima | .............. | 348/333.03 |
| 6,937,773 B1 * | 8/2005 | Nozawa et al. | ............... | 382/243 |
| 6,950,471 B2 * | 9/2005 | Kishi | ........................ | 375/240.19 |
| 7,039,250 B2 * | 5/2006 | Kuroiwa | ........................ | 382/248 |
| 7,068,848 B2 * | 6/2006 | Park et al. | ...................... | 382/240 |
| 7,092,569 B1 * | 8/2006 | Kinjo | ............................. | 382/190 |
| 7,187,798 B1 * | 3/2007 | Payton | .......................... | 382/166 |
| 7,236,629 B2 * | 6/2007 | Cooper et al. | ................ | 382/171 |
| 7,366,350 B2 * | 4/2008 | Kajihara | ........................ | 382/167 |
| 7,397,851 B2 * | 7/2008 | Roman | ..................... | 375/240.01 |
| 7,400,754 B2 * | 7/2008 | Jung et al. | ...................... | 382/128 |
| 7,496,234 B2 * | 2/2009 | Li | .................................. | 382/232 |
| 7,574,063 B2 * | 8/2009 | Kajiwara et al. | .............. | 382/239 |
| 7,580,169 B2 * | 8/2009 | Fukuda | .......................... | 358/538 |
| 2002/0196848 A1 * | 12/2002 | Roman | ..................... | 375/240.08 |

(Continued)

FOREIGN PATENT DOCUMENTS

JP 2005-318167 A 11/2005

OTHER PUBLICATIONS

Information Technology—JPEG 2000 Image Coding System: Core Coding System, Aug. 2002.

*Primary Examiner* — Samir Ahmed
(74) *Attorney, Agent, or Firm* — Dickstein Shapiro LLP

(57) ABSTRACT

An image compressing apparatus carrying out code amount control upon JPEG2000 coding, in which the number of coding passes and a code amount for each code block generated by a MQ (arithmetic) coder are input, and the number of coding passes and the code amount are determined based on a first code amount control standard and a second code amount control standard given for each code block. For a specific code block, the second code amount control standard is used to determine the number of coding passes and the code amount, while, for the other code blocks, the first code amount control standard is used to determine the number of coding passes and the code amount.

11 Claims, 15 Drawing Sheets

U.S. PATENT DOCUMENTS

| | | | |
|---|---|---|---|
| 2003/0007561 A1* | 1/2003 | Kajiwara | 375/240.11 |
| 2004/0161156 A1 | 8/2004 | Matsubara | |
| 2005/0100226 A1* | 5/2005 | Kajiwara et al. | 382/232 |
| 2005/0100229 A1* | 5/2005 | Becker et al. | 382/232 |
| 2005/0220339 A1* | 10/2005 | Kim | 382/165 |
| 2006/0177138 A1 | 8/2006 | Kadowaki | |
| 2006/0228028 A1 | 10/2006 | Kadowaki | |
| 2008/0107174 A1* | 5/2008 | Roman | 375/240.02 |

\* cited by examiner

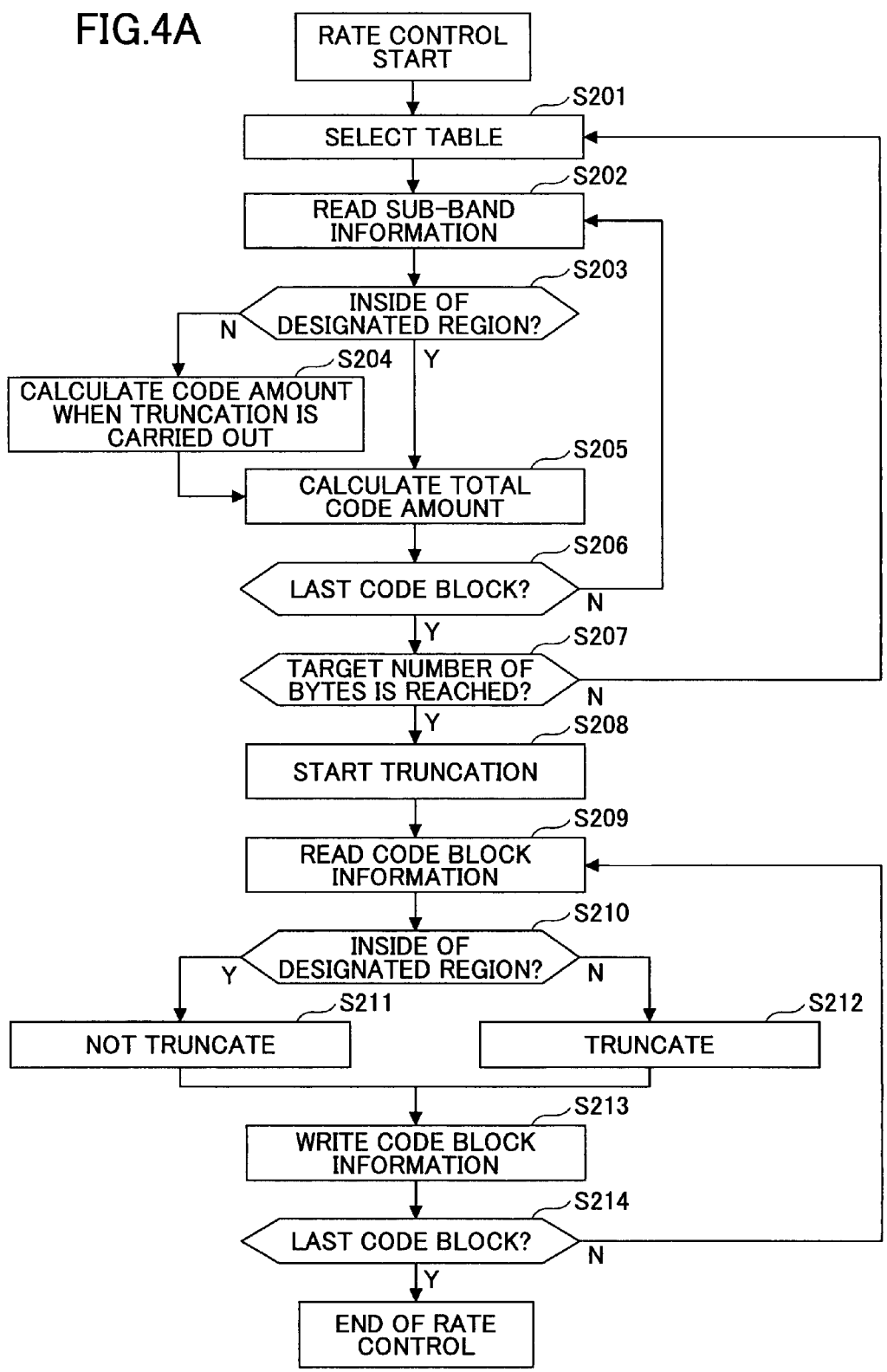

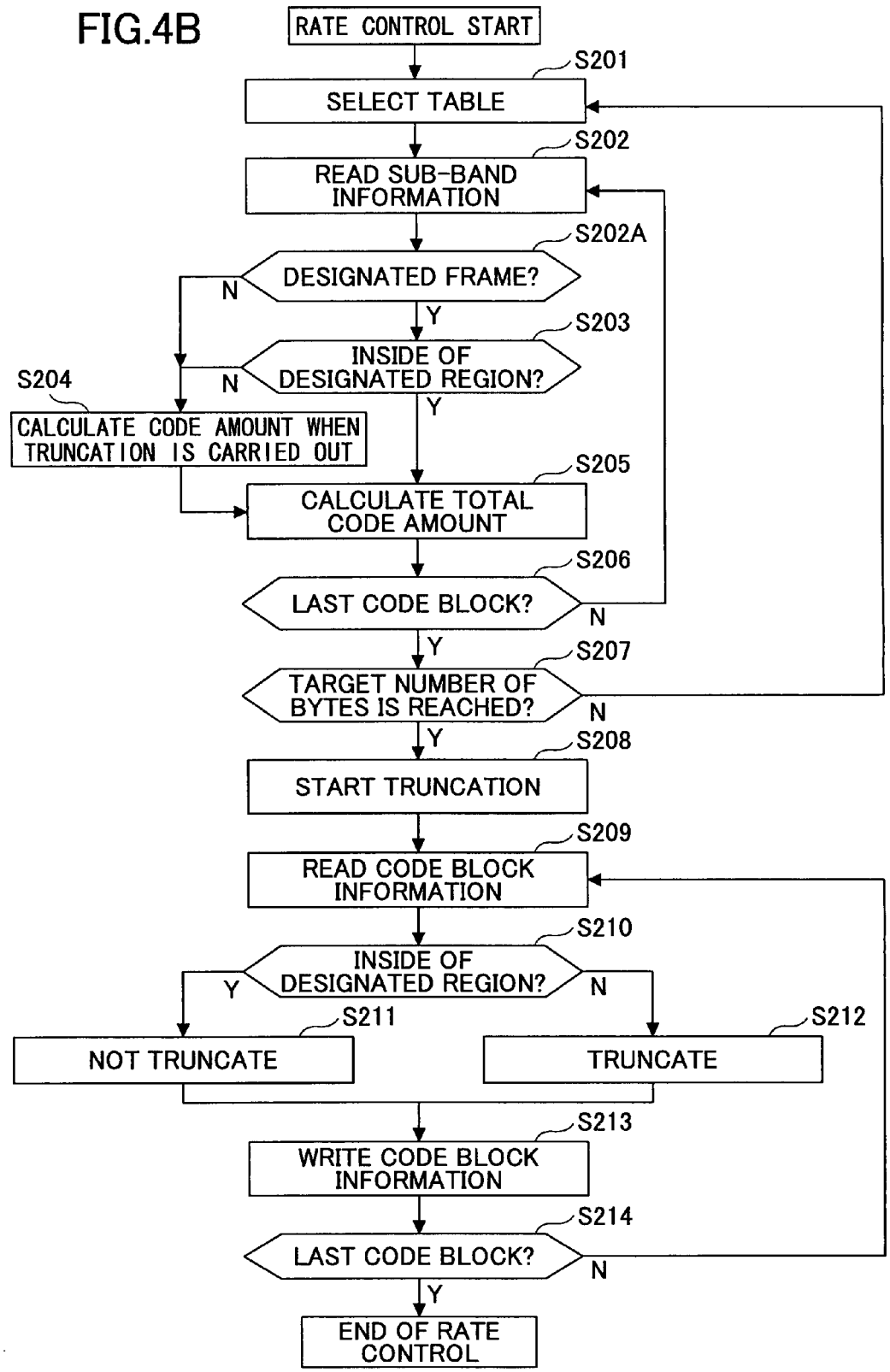

FIG.5
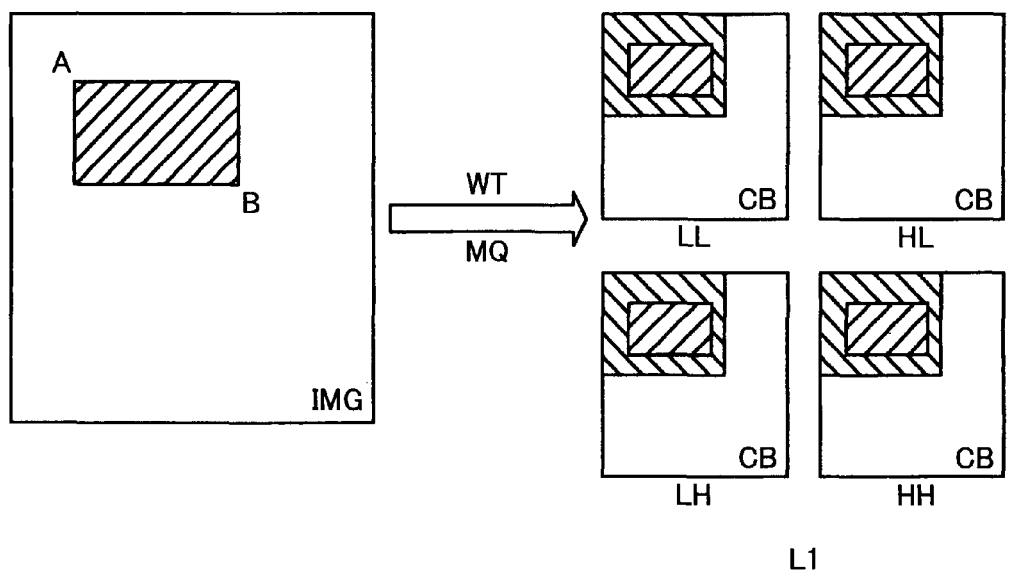
IMG: IMAGE
MQ: ARITHMETIC CODING
L1: RESOLUTION LEVEL 1
 DESIGNATED REGION
WT: WAVELET TRANSFORM
CB: CODE BLOCK
LL, HL, LH, HH: RESPECTIVE SUB-BANDS
 CODE BLOCK INSIDE OF DESIGNATED REGION X: IMAGE X DIRECTION COORDINATE
C: CODE BLOCK COUNTER
I: X DIRECTION COORDINATE IN CODE BLOCK
L: RESOLUTION LEVEL (FOR A CASE OF 14 BIT REGISTER, AND CODE BLOCK SIZE OF 32)

IMAGE COMPRESSING APPARATUS, IMAGE COMPRESSING METHOD AND PROGRAM

BACKGROUND OF THE INVENTION

1. Field of the Invention

The present invention relates to an image compressing apparatus, an image compressing method and a program therefor, for compressing and coding image data according to JPEG2000 or such. The present invention in particular relates to compressing/decompressing static image or moving picture, and, in further particular, the present invention can be applied to image processing for a digital still camera, a recording part of a digital copier, a surveillance camera, a digital video storage, digital camera (for taking moving picture), a satellite communication apparatus, a medical equipment, a browser for the Internet, or such.

2. Description of the Related Art

Recently, as a compressing and coding method suitable to processing of high-definition images, JPEG2000 is known. In JPEG2000 coding, after given image data is transformed into respective color components of Y, Cb and Cr, two-dimensional discrete wavelet transform as frequency analysis is carried out on each of the respective data components.

JPEG2000 defines ways of compressing/decompressing image data.

FIG. 9 shows a functional block diagram for illustrating a basic JPEG2000 algorithm. This figure shows, in a block manner, an algorithm corresponding to various functions which actually a computer carries out according to a corresponding computer program for image processing, for JPEG2000 image compressing/decompressing.

As shown in FIG. 9, the JPEG2000 algorithm includes a color space transform/inverse transform part 111, a two-dimensional wavelet transform/inverse transform part 112, a quantization/inverse quantization part 113, an entropy coding/decoding part 114 and a tag processing part 115 (see Japanese Laid-Open Patent Application 2004-214828 (Patent Document 1), corresponding to United States Patent Publication No. US 2006/0228028 A1).

Wavelet transform coefficient data (for example, 16-bit data) obtained from the wavelet transform is divided into bit planes in which sub-bands (for example, in a case of three-level wavelet transform, 3LL, 3HL, 3LH, 3HH, 2HL, 2LH, 2HH, 1HL, 1LH and 1HH) are used as processing units. Then, for each sub-band, the respective bit planes are scanned in sequence in three types of methods, and arithmetic coding is carried out. The above-mentioned three types of methods are called "significant propagation pass", "magnitude refinement pass" and "cleanup pass".

Compressing of the code data is carried out in such a manner that the code data of the coding passes of all the code blocks of the respective sub-bands obtained from the above-mentioned scanning in the three types of methods is partially deleted (truncated) uniformly in sequence from the least significant bit planes. There, deleting of the code data means that a value of the bit data to be deleted is replaced by 0 (null data). Details of JPEG2000 coding are known, for example, see 'General outline of new international standard method of static image coding (JPEG2000)', Institute of Image Information and Television Engineer, year 2000, Vol. 54, No. 2, pages 164-171 (Non-patent document).

Further, other than the above-mentioned Japanese Laid-Open Patent Application 2004-214828 (Patent Document 1), Japanese. Laid-Open Patent Application No. 2004-304238 (Patent document 2) and Japanese Laid-Open Patent Application 2004-297712 (Patent document 3), disclose image compressing technologies, for example.

According to Japanese Laid-Open Patent Application 2004-214828 (Patent Document 1), means for executing image compressing according to JPEG2000 and means for decompressing images compressed according to a method other than JPEG2000 standard, are provided. Designation of a region of interest is allowed for an image file stored in a storage area. It is determined whether the image file is a non-compressed file or a compressed file compressed according to the method other than JPEG2000 standard, When it is determined that the image filed is the non-compressed image file, it is compressed by the compressing means. When it is determined that the image file is the compressed file compressed according to the method other than JPEG2000 standard, it is once decompressed by the decompressing means, and then, it is compressed by the compressing means. Then, from the thus-compressed image, a block corresponding to the designated region of interest is extracted and output.

According to Japanese Laid-Open Patent Application No. 2004-304238 (Patent document 2), corresponding to United States Patent Publication No. US 2006/0177138 A1, a coding part for generating code data by coding coefficient data obtained from frequency analysis of image data for each processing unit; a data reducing part reducing the code data amount by deleting the code data thus generated for each processing unit by the coding part; and a data processing part dividing the coefficient data in the respective processing units into coefficient data in second processing units, and, increasing the code data reducing amount in the data reducing part according to a value size of the coefficient data in the second processing units, are provided.

According to Japanese Laid-Open Patent Application 2004-297712 (Patent document 3), corresponding to United States Patent Publication, No. 2004/0161156 A1, a coding part generating code data by coding given coefficient data obtained from frequency analysis carried out on given image data; a table in which data determining contents to delete the code data from the code data corresponding to the least significant bits of the coefficient data in the respective processing units are arranged in such a manner that the code data deleting amount gradually increases or decreases along with increase in the data numbers, and also, reproduction image quality gradually degrades or improves; and a rate control part calculating a variable of the code data obtained when the code data is deleted according to the data read from the table and determining the data number of data in which the variable of the calculated code data can be regarded as a target value.

FIG. 10 shows a configuration of an image compressing apparatus according to the above-mentioned Patent documents 2 and 3.

As shown in FIG. 10, the image compressing apparatus 100 includes a wavelet transform part 10, an arithmetic coding part 20, a packet header generating part 30, a memory controller 40 and a DRAM 50. The memory controller 40 acts as a so-called arbiter circuit, and carries out arbitration of a data access right to the DRAM 50 from DMAs 13, 21, 25, 31, 33, 35 and 37 included in the above-mentioned wavelet transform part 10, the arithmetic coding part 20 and the packet header generating part 30.

The wavelet transform part 10 transforms given image data into 16-bit wavelet coefficients. A color transform circuit 11 transforms given image data into respective color components of Y, Cb and Cr, and outputs the same. A wavelet transform circuit 12 carries out two-dimensional discrete wavelet transform on data of the respective color components obtained from the color transform. The DMA 13 stores, in a predetermined address of the DRAM 50, the thus-generated wavelet coefficients.

The arithmetic coding part 20 carries out arithmetic coding of the wavelet coefficients thus stored in the DRAM 50, writes code data in the DRAM 50 for respective coding passes of each sub-band, also, determines a mask amount (number of coding passes) for each code block of each sub-band, and writes the thus-determined mask amount in a memory A or B.

Further, from the thus-obtained mask amounts and code amounts for the respective coding passes of each code block, a code amount to reduce when the coding passes of each sub-band are deleted one by one based on truncation data is determined, and the thus-obtained value is written in a memory C or D.

The DMA 21 reads, in sub-band units, the wavelet coefficients from the DRAM 50. The thus-read 16-bit wavelet coefficients are entropy-coded, then, are input to a bit-plane dividing circuit and, are divided into 16 bit planes.

An arithmetic coding circuit 24 carries out arithmetic coding with scanning the data of the respective bit planes for each sub-band in sequence from the most significant bits in the above-mentioned three types of methods (called the coding passes). The above-mentioned three types of methods are called 'significant propagation pass', 'magnitude refinement pass' and 'cleanup pass', as mentioned above. The code data output from the arithmetic coding circuit 24 is configured by code data of 46 coding passes (i.e., 15×3+1=46), and, is written in the DRAM 50 by means of the DMA 25.

The wavelet coefficients read from the DRAM 50 by the DMA 21 are input, not only in the quantization circuit 22 but also in an average calculating circuit 26. The average calculating circuit 26 calculates an average of the wavelet coefficients of effective pixels of each code block, and outputs the same.

A masking coefficient calculating circuit 27 determines an additional masking coefficient of 'zero', 'one' or 'two' coding passes, i.e., a mask amount (the number of coding passes to delete the code data) according to the average of the wavelet coefficients of each code block, output from the average calculating circuit 26 in sequence.

The memories A and B act as memories alternately switched in frame image units to process, and record the mask amount of each sub-band, output from the masking coefficient circuit 27.

The code data output from the arithmetic coding circuit 24 is output also to a code amount calculating circuit 28. The code amount calculating circuit 28 counts the code amount for each coding pass corresponding to the bit plane of each code block, and outputs the thus-obtained coefficient value to a data processing circuit 29.

To the data processing circuit 29, further the mask amounts (each corresponding to the number of coding passes) of the respective code blocks written in the memories A and B are output. The data processing circuit 29 further obtains a code data reducing amount determined in consideration of the mask amount, for when the coding passes of the code data of each sub-band are reduced one by one from the least significant bit plane, and, writes data representing the thus-obtained code data reducing amounts in the memories C and B.

The packet header generating part 30 determines a data number of truncation data appropriate to reduce a predetermined amount of the code data, based on the code data reducing amount, for when the coding passes of the code data of each sub-band obtained in the above-mentioned arithmetic coding part 20 is reduced one by one from the least significant bit plane, also with the mask amount for each code block being considered, then generates a packet header of the code data obtained based on the truncation data of the thus-determined data number, creates a bit stream, and outputs the same.

First, a rate control circuit 32 reads, from the DRAM 50 by means of the DMA 31, the truncation data of the data number 128, calculates a total of code data reducing amounts determined for the respective code blocks for all the sub-bands, according to the thus-read truncation data, and compares it with a target reducing amount.

When the target reducing amount has not yet reached, then the truncation data of the larger data number is read, and, according to the thus-read truncation data, the total of the code data reducing amounts are obtained for all the sub-bands. On the contrary, i.e., when the target reducing amount has been already exceeded, then the truncation data of the smaller data number is read, and, according to the thus-read truncation data, the total of the code data reducing amounts are obtained for all the sub-bands, again. Thus, the single data number of the truncation data, with which the above-mentioned total code data reducing amount can be regarded as the target reducing amount, is determined, and data representing the thus-obtained data number is output to a subsequent packet information generating circuit 34.

The rate control part 32 generally includes an address generating circuit, a code amount calculating circuit and a data number switching circuit. The address generating circuit and the code amount calculating circuit function as a calculating part for reading the truncation data of the designated data number from the above-mentioned truncation table, and calculating the code amount variable for when the code data on the side of the least significant bit from the code data in respective processing units is deleted according to the thus-read truncation data. The address generating circuit generates an address for reading data of the code amount of the bit plane to add or reduce based on the truncation data input by means of the DMA 31, and outputs the same in the memories C and D.

One of the memories C and D in an enable state storing the data of frame images which are currently processed, outputs, from the designated address, the stored code data to the code amount calculating circuit.

The code amount calculating circuit thus obtains the total of the code data reducing amounts for all the sub-bands, thus sent from the memory C or D, compares the thus-obtained total amount with the target reducing amount, and outputs a signal indicating the comparison result to the subsequent data number switching circuit.

The data number switching circuit requests, from the DRAM 50, the different data number of truncation data, based on the comparison result signal thus-output from the code amount calculating circuit for some case. Or, the data number switching circuit outputs a signal indicating that the final data number with which the code data reducing amount can be regarded as the target reducing amount, to the packet information generating circuit 34.

A packet header generating circuit 36 generates a packet header from data of the above-mentioned calculated numbers of the coding passes and the code amounts of the code blocks of the respective sub-bands and the number of zero bit planes output from the packet information generating circuit 34, as well as data of the code data read from the DRAM 50 by means of the DMA 37, and so forth, and outputs the same to a code creation circuit 38.

The code creation circuit 38 creates a bit stream from the data output from the packet header generating circuit 36, and thus, outputs the code data from which the code data has been thus reduced by the target reducing amount. Thus, the general outline of the image compressing apparatus according to the above-mentioned Patent documents 2 and 3 has been discussed.

According to JPEG2000, a function called ROI (Region Of Interest) is provided for improving an image quality only for a 'part selected from a given image'. In order to achieve the ROI function, it is necessary to carry out predetermined processing corresponding thereto previously upon coding the same. According to a basic way of JPEG2000, a method of 'weighting coefficients of a region of interest' is used. Specifically, exponentiation of 2 is used for the weighting, by means of a bit shift.

FIG. 11 shows a processing flow of JPEG2000 coding in the related art.

As shown in FIG. 11, a given image is wavelet-transformed (Step S501), is quantized (Step S502) and is MQ (arithmetic)-coded (Step S503), code is thus created (Step S504), and thus, compressed image data is obtained (Step S504). Commonly, in order to achieve the ROI function, the corresponding processing should be carried out previously upon coding.

FIG. 12 shows a flow including the above-mentioned ROI processing carried out upon coding.

As shown in FIG. 12, a given image is wavelet-transformed (Step S601), is bit-shifted (Step S602), is quantized (Step S603) and is MQ (arithmetic)-coded (Step S604), code is thus created (Step S605), and thus, compressed image data is obtained (Step S606).

As a specific method to be used for the ROI processing, two methods may be used. That is, according to the first method, in the quantizing Step, quantization is made more finely for the ROI, with respect to the other region. According to the second method, weighting is made on the ROI. In the second method, specifically, as mentioned above, exponentiation of 2 is used for the weighting, by means of a bit shift (corresponding to Step S602 of FIG. 12).

The basic way of JPEG2000 adopts the second method. An actual amount of the bit shift corresponds to the maximum number of bits of coefficients of the region other than the ROI. From this point, this method is called 'Maxshift method'. The coefficients of the ROI region should be returned to the same range as that of the coefficients of the other region (background region) upon decoding, while the shifted-up state obtained from the bit shift should be maintained.

FIG. 13 shows a flow of the ROI processing upon decoding. Basically, the processing is carried out in the order reverse to that of the processing shown in FIG. 12. That is, compressed data is code-analyzed (Step S701), is MQ-decoded (Step S702), is inverse-quantized (Step S702), is bit-shifted (Step S703), and then, is inverse-wavelet-transformed (Step S704), and thus, an image is restored (Step S706).

Thus, in the bit shift method, ROI mask information should be created upon coding and upon decoding, and also, a circuit for carrying out a bit shift of wavelet coefficients and a circuit for calculating a bit-shift amount should be provided. Further, for a case of processing an image such as a color image which has a plurality of components, sub-sampling processing may be required in many cases. When sub-sampling is carried out, the ROI mask should be sub-sampled accordingly.

Thus, in the related art, in order to achieve a function analogous to the ROI function by adjusting a code amount in such a manner that a target code amount may be reached, and improving image quality of the ROI, a bit shift should be carried out for weighting coefficients and the shift amount should be calculated. Thus, a circuit configuration may become complicated.

SUMMARY OF THE INVENTION

An object of the present invention is to provide an image compressing apparatus, an image compressing method and a program therefor, by which, instead of carrying out such a complicated calculation and providing such a complicated circuit configuration, an image effect analogous to that obtained from the known ROI function can be obtained with a more simple way. In order to distinguish from the ROI in the related art, a term 'designated region' is used instead of 'ROI', hereinafter, for the present invention.

According to the present invention, an image compressing apparatus is configured to carry out code amount control upon JPEG2000 coding, in which the number of coding passes and a code amount for each code block generated by a MQ (arithmetic) coder are input, and a number of coding passes and a code amount are determined based on a first code amount control standard and a second code amount control standard given for each code block. In this configuration, for a specific code block, the second code amount control standard is used to determine the number of coding passes and the code amount, while, for the other code blocks, the first code amount control standard is used to determine the number of coding passes and the code amount.

Other objects and further features of the present invention will become more apparent from the following detailed description when read in conjunction with the accompanying drawings:

BRIEF DESCRIPTION OF THE DRAWINGS

FIG. 4A shows a flow of rate control processing according to the embodiment of the present invention for when a designated region is given;

FIG. 4B shows a flow of rate control processing according to the embodiment of the present invention for when, further, a frame is designated;

FIG. 5 shows an example of code blocks belonging to a designated region, according to the embodiment of the present invention;

DETAILED DESCRIPTION OF THE PREFERRED EMBODIMENTS

Figure 1:
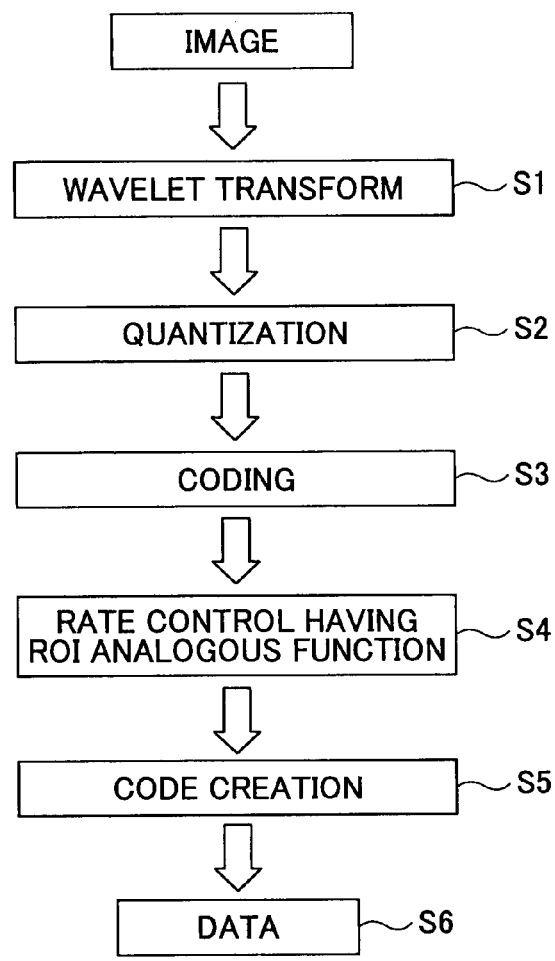
FIG. 1 shows a flow of processing according to an embodiment of the present invention including rate control processing analogous to ROI processing.

According to an embodiment of the present invention, an image compressing apparatus is configured to carry out code amount control upon JPEG2000 coding, in which a number of coding passes and a code amount for each code block generated by a MQ (arithmetic) coder are input, and a number of coding passes and a code amount are determined based on a first code amount control standard and a second code amount control standard given for each code block, and has a part using, for a specific code block, the second code amount control standard to determine the number of coding passes and the code amount, and using, for the other code blocks, the first code amount control standard to determine the number of coding passes and the code amount.

In this configuration, since the code amount control standard is changed for each code block appropriately, it is possible to change an image quality only for a specific part accordingly.

In the image compressing apparatus, the first code amount control standard may be such that the predetermined number of coding passes to discard is used as it is for each coding block.

In this configuration, coding passes of each code block are discarded from the least significant one in sequence, and thus, it is possible to obtain a code amount close to a previously set code amount.

In the image compressing apparatus, the second code amount control standard may be such that the number of coding passes to discard is zero, and thus, no code generated by the MQ coder is discarded for a code block belonging to a designated spatial region.

In this configuration, for a specific code block, the code data is kept undiscarded. On the other hand, for the other code blocks, code data is discarded. Accordingly, it is possible to improve image quality of the specific code block.

In the image compressing apparatus, the code blocks to use the second code amount control standard may be determined by a predetermined spatial coordinate position.

In this configuration, the code block to use the second code amount control standard is determined by the predetermined spatial coordinate position. Accordingly, it is possible to improve image quality only for the specific region.

In the image compressing apparatus, the code blocks to use the second code amount control standard may be determined by a frame to process.

In this configuration, the code block to use the second code amount control standard is determined by the frame to process. Accordingly, it is possible to improve image quality only for the specific frame from among a given plurality of frames.

An image compressing method for carrying out code amount control upon JPEG2000 coding, in which a number of coding passes and a code amount for each code block generated by a MQ (arithmetic) coder are input, and a number of coding passes and a code amount are determined based on a first code amount control standard and a second code amount control standard given for each code block, includes the steps of: a) using, for a specific code block, the second code amount control standard to determine the number of coding passes and the code amount; and b) using, for the other code blocks, the first code amount control standard to determine the number of coding passes and the code amount.

In this configuration, since the code amount control standard is changed appropriately for each code block, it is possible to change an image quality only for the specific part accordingly.

In the image compressing method, the first code amount control standard may be such that the predetermined number of coding passes to discard is used as it is for each coding block.

In this configuration, coding passes of each code block are discarded from the least significant one in sequence, and thus, it is possible to obtain a code amount close to a previously set code amount.

In the image compressing method, the second code amount control standard may be such that the number of coding passes to discard is zero, and thus, no code generated by the MQ coder is discarded for a code block belonging to a designated spatial region.

In this configuration, for the specific code block, the code data is kept undiscarded. On the other hand, for the other code blocks, code data is discarded. Accordingly, it is possible to improve image quality of the specific code block.

In the image compressing method, the code blocks to use the second code amount control standard may be determined by a predetermined spatial coordinate position.

In this configuration, the code block to use the second code amount control standard is determined by the predetermined spatial coordinate position. Accordingly, it is possible to improve image quality only for the specific region.

In the image compressing method, the code blocks to use the second code amount control standard may be determined by a frame to process In this configuration, the code block to use the second code amount control standard is determined by the frame to process. Accordingly, it is possible to improve image quality only for the specific frame from among a given plurality of frames.

A program for image compressing comprising instructions to cause a computer (such as that shown in FIG. 14) to carry out code amount control upon JPEG2000 coding, in which a number of coding passes and a code amount for each code block generated by a MQ (arithmetic) coder are input, and a number of coding passes and a code amount are determined based on a first code amount control standard and a second code amount control standard given for each code block, has instructions to cause the computer to use, for a specific code block, the second code amount control standard to determine the number of coding passes and the code amount; and use, for the other code blocks, the first code amount control standard to determine the number of coding passes and the code amount.

In this configuration, since the code amount control standard is changed appropriately for each code block, it is possible to change an image quality only for the specific part accordingly.

Figure 13:
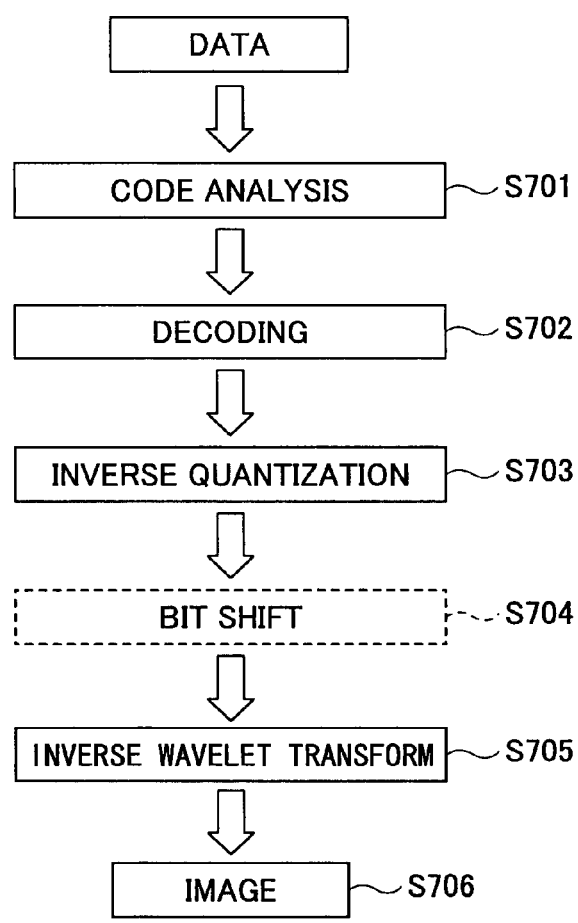
FIG. 13 shows a flow of ROI processing upon decoding.

In a method called 'rate control' (see the 'rate control circuit 32' of FIG. 13), upon JPEG2000 coding, as disclosed in the above-mentioned Patent documents 1 and 2, adjustment is made in such a manner as to obtain a previously set target code amount by discarding, from the least significant one, code data having undergone arithmetic coding.

According to an embodiment of the present invention, instead of the above-mentioned bit shift method, an effect analogous to that obtained from the ROI function described above can be obtained as a result of, upon rate control, a data amount to discard is adjusted between the inside of a designated region and the outside of the designates region.

FIG. 1 shows a flow of processing according to the embodiment of the present invention including rate control processing analogous to the ROI processing. In the embodiment, as shown in FIG. 1, a given image is wavelet-transformed (Step S1), is quantized (Step S2), is MQ-coded (Step S3), then undergoes rate control having an ROI analogous function (Step S4), code is thus created (Step S5) and thus, compressed image data is obtained (Step S6).

Next, a procedure of the rate control according to the embodiment of the present invention will be described briefly.

Figure 2:
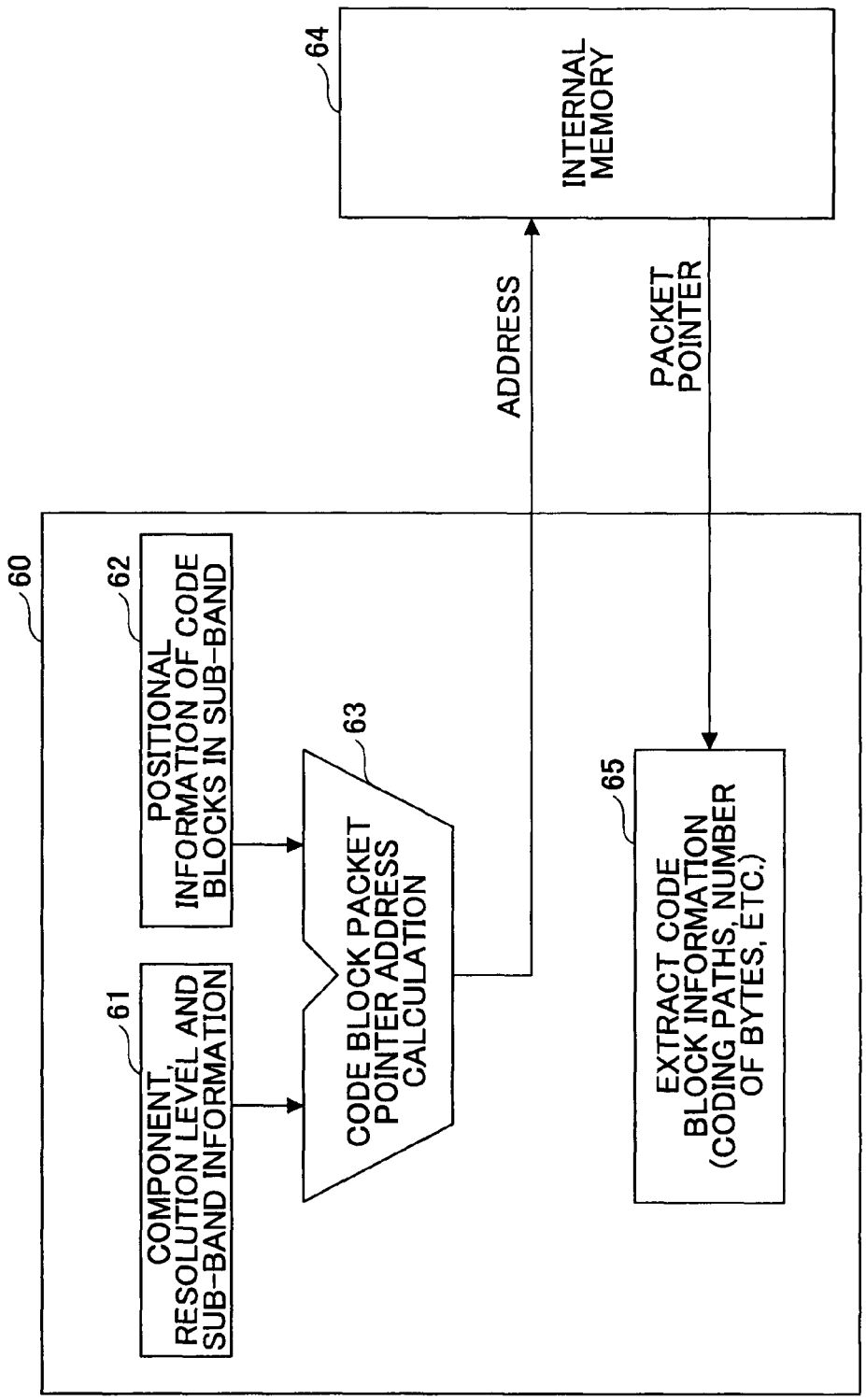
FIG. 2 shows a block diagram for illustrating the embodiment of the present invention for reading code block information.

FIG. 2 shows a block diagram for illustrating an example of reading code block information.

Upon JPEG2000 coding, information of each code block obtained from arithmetic coding (the number of zero bit planes, the number of coding passes, a code block code amount, a code amount for each coding pass and so forth) is recorded in an internal memory 64 area called a packet pointer.

The information of one code block configures one packet pointer. A memory address of the packet pointer of each code block is determined uniquely by a component in which the code block shown in FIG. 2, reference numeral 61, a resolution level, sub-band information, and position information of the code blocks inside of the sub-band (63).

Further, the code amounts are summed for respective cosign passes for each sub-band, and, are recorded in an internal memory 64. This information will be read upon rate control.

The top address SA of the memory storing the code block information is obtained from the following formula, assuming that SA(SUB) denotes a memory start address of the sub-band belonging to certain component and resolution level, and (Y, X) denotes a position of vertical/horizontal directions of the code block inside of the sub-band:

$$SA(CB)=SA(SUB)+Y*Xh+X$$

There, Xh denotes the number of code blocks in the horizontal direction of the sub-band. An adder 63 shown in FIG. 2 has a function corresponding to the above formula.

In processing of the rate control described below, an address of the packet pointer is calculated from the position of the code block (63), the corresponding packet pointer is read from the internal memory, and the corresponding code block information (the number of coding passes, the number of bytes and so forth) is thus extracted (65).

Figure 3:
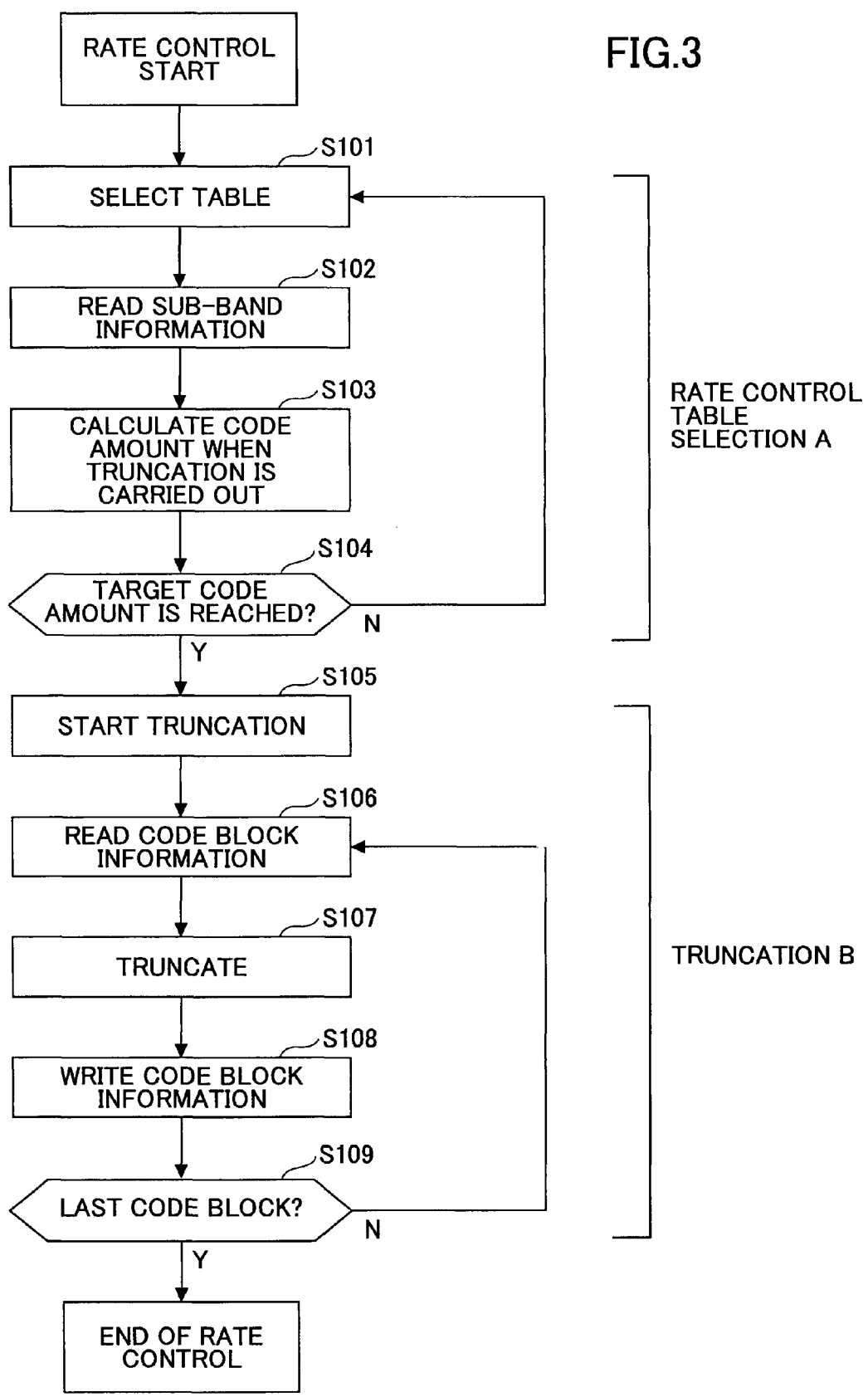
FIG. 3 shows a flow of general rate control processing according to the embodiment of the present invention.

FIG. 3 shows a flow of general rate control processing. The rate control generally includes two processes.

The first process is a process A of selecting a rate control table. This process is a process of determining one table to be used from among a prepared plurality of rate control tables.

The second process is a truncation process B. This process is a process in which, with the use of the thus-selected rate control table (i.e., a truncation table), truncating of coding passes of each code block, and changing the code amount information accordingly, are carried out.

The truncation table describes, for each sub-band, a truncation amount of coding passes of the code blocks included in the sub-band. An example of the truncation table for a resolution level 5 is shown below:
i194 c0: 1, 1 1 1, 1 1 1, 1 1 1, 2 2 2, 6 6 11
i194 c1: 1, 2 2 2, 2 2 3, 4 4 5, 6 7 9, 11 11 16
i194 c2: 1, 1 1 2, 2 2 3, 3 3 4, 5 5 7, 9 9 12

There, c0 denotes a component 0, specifically a Y component; c1 denotes a component 1, specifically a Cb component; and c2 denotes a component 2, specifically a Cr component.

The numerals on each line represent, for example, c0: 5LL, 5HL-LH-HH, 4HL-LH-HH, 3HL-LH-HH, 2HL-LH-HH, 1HL-LH-HH.

That is, 5LL shows a truncation amount in coding pass unit for the sub-band of a LL component in the level 5;

5HL-LH-HH respectively show truncation amounts in coding pass unit for the sub-bands of a HL component, a LH component and a HH component in the level 5;

4HL-LH-HH respectively show truncation amounts in coding pass unit for the sub-bands of a HL component, a LH component and a HH component in the level 4;

3HL-LH-HH respectively show truncation amounts in coding pass unit for the sub-bands of a HL component, a LH component and a HH component in the level 3;

2HL-LH-HH respectively show truncation amounts in coding pass unit for the sub-bands of a HL component, a LH component and a HH component in the level 2; and 1HL-LH-HH respectively show truncation amounts in coding pass unit for the sub-bands of a HL component, a LH component and a HH component in the level 1.

The table data is disposed in the order of addresses from the start address in the memory.

First, the process A of selecting the rate control table will be described.

Upon stating of the rate control, one truncation table is selected (Step S101), code amount information for each coding pass in the sub-band is read from the memory (Step S102), the code amount of the sub-band after carrying out the truncation is calculated (Step S103), the processing in Step S103 is carried out for all the sub-bands, and, when the thus-calculated total code amount for all the sub-bands has reached a given target code amount, the truncation table is regarded as a final one, and Step S105 is then carried out. On the other hand, when the calculated total code amount has not yet reached the target code amount (No in Step S104), a subsequent table is selected according to the difference from the target code amount (Step S101). Thus, such a truncation amount as that to obtain the target code amount is finally determined.

Next, a flow of the truncation B will be described.

Truncation is started (Step S105), a single code block is read from the memory (Step S106), truncation of the coding passes is carried out from the code block according to the thus-selected truncation table (Step S107), the code block information reflecting the truncation result is obtained, and is written as new one in the memory (Step S108). When the processing has been finished for all the code blocks (Yes in Step S109), the rate control is finished.

Thus, in the rate control processing according to the embodiment of the present invention, the number of coding passes to be truncated is the same in sub-band unit.

Next, an example in which the embodiment of the present invention is applied for when the entire code amount is adjusted, without carrying out truncation on a designated region determined from a given spatial coordinate position upon rate control during coding, is described.

According to the embodiment of the present invention, the truncation amount is controlled for each code block, and thus, an ROI analogous effect is obtained. Accordingly, any special processing is not required upon decoding.

FIG. 4A shows a flow of processing for when the above-mentioned designated region is given.

A flow of selection of a truncation table will be described first.

In Step S201, one truncation table is selected. In Step S202, one code block information is read from the memory.

Next, it is determined whether or not the code block is one included in the given designated region, in Step S203. When the code block is one included in the designated region (Yes), 0 is set as a truncation amount and the code amount of the code block is added as it is to a total code amount (Step S205).

On the other hand, when the code block is one not included in the designated region (No in Step S203), truncation of coding passes is carried out according to the selected truncation table, a code amount of the code block after thus carrying out the truncation is calculated (Step S204), and the thus-obtained code amount is added to the total code amount (Step S205).

The processing of Steps S202 through S205 is carried out for all the code blocks. Then, when the thus-obtained total code amount has reached the target code amount or when the last truncation table has been reached (Yes in Step S207), the current truncation table is regarded as a final truncation table. Otherwise (No in Step S207), another truncation table is selected in Step S201. Then, the above-mentioned processing (Steps S201 through S207) is carried again with the thus-selected truncation table.

Next, a flow of truncation is described.

The truncation is started in Step S208, and one code block information is read from the memory in Step S209.

When the read code block is one included in the designated region (Yes in Step S210), 0 is set in the truncation amount, and thus, the code block information is kept unchanged (Step S211).

On the other hand, when the code block is one not included in the designated region (No in Step S210), truncation of coding passes is carried out on the code block according to the selected truncation table (Step S212), and the code block information reflecting the truncation is obtained.

Next, in Step S213, the thus-obtained information is written in the memory as new code block information. The processing of Steps S209 through S213 is carried out for all the code blocks (Step S214). Thus, the rate control is finished.

A main difference from the rate control for when no designated region is given described with reference to FIG. 3 is that, different processing is carried out according to whether or not the code block is included in the designated region.

Next, calculation of a code block included in the designated region will be described.

FIG. 5 shows an example of a code block included in the designated region.

The designated region is assumed rectangular and spatial information thereof is defined by a top left vertex A and a bottom right vertex B thereof. When a resolution level of an original image is zero, a size of a corresponding sub-band becomes half when the resolution level increases by one.

That is, the size of the designated region in the original image becomes half in size in a corresponding sub-band accordingly when the resolution level increases by one, as shown in FIG. 5. That is, for a code block of exponentiation of 2, it is possible to determine whether or not the code block belongs to the designated region by reading the most significant bit of the vertexes A and B of the designated region.

Figure 6:
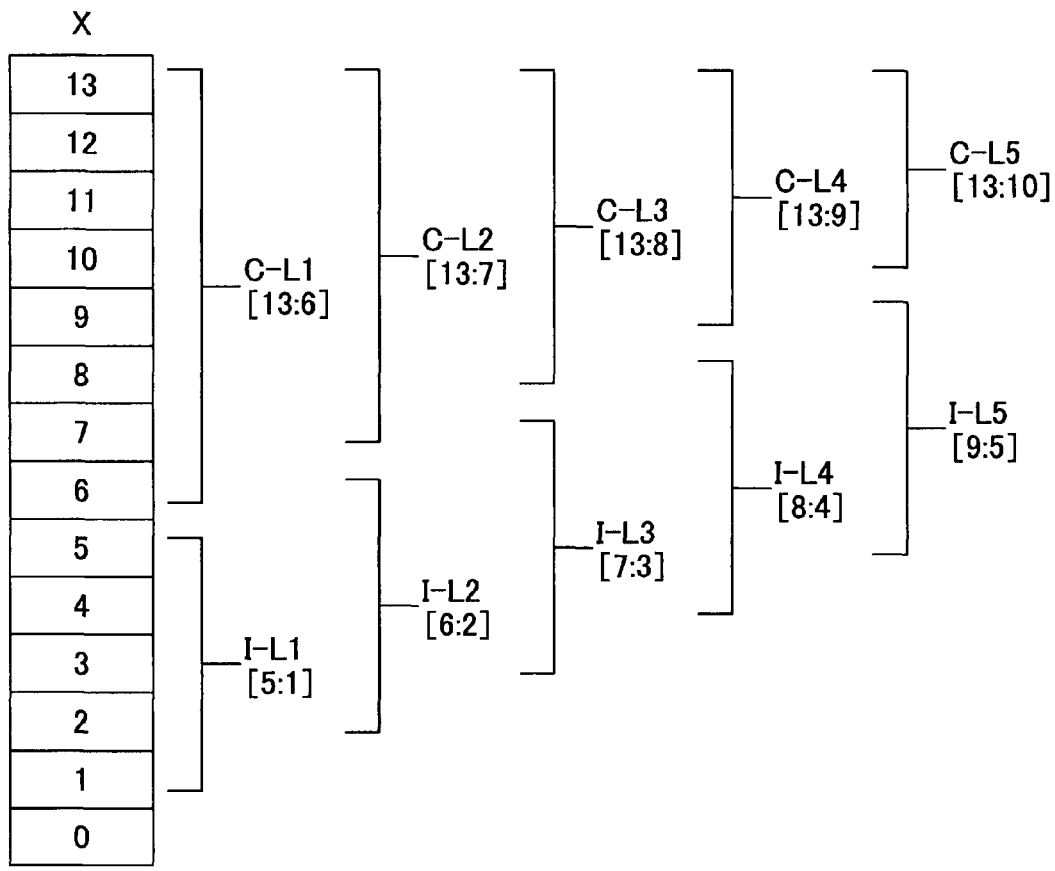
FIG. 6 shows an example of calculation of code blocks in the designated region, according to the embodiment of the present invention.

FIG. 6 shows an example of the calculation of the code block included in the designated region.

When the size of the original image is not more than '8192 by 8192', the X-direction coordinate thereof can be covered by a register of 14 bits. When the resolution level is 1, the size of the corresponding sub-band becomes half as mentioned above. Accordingly, the most significant bit (13-th bit) through a bit (1-st bit) immediately before the least significant bit (0-th bit) in the register represent the X-direction coordinates inside of the sub-band.

On the other hand, when the code block size is 32 (fifth power of 2), the 5 least significant bits (1 through 5) represent the X-directional coordinate inside of the code block, and the 8 most significant bits (6 through 13) represent the X-directional coordinate of the code block. The same manner is applied also to the Y direction and, for the level 1 and more, analogy is carried out. Thus, the position of the code block or the position inside of the code block can be calculated.

Figure 7:
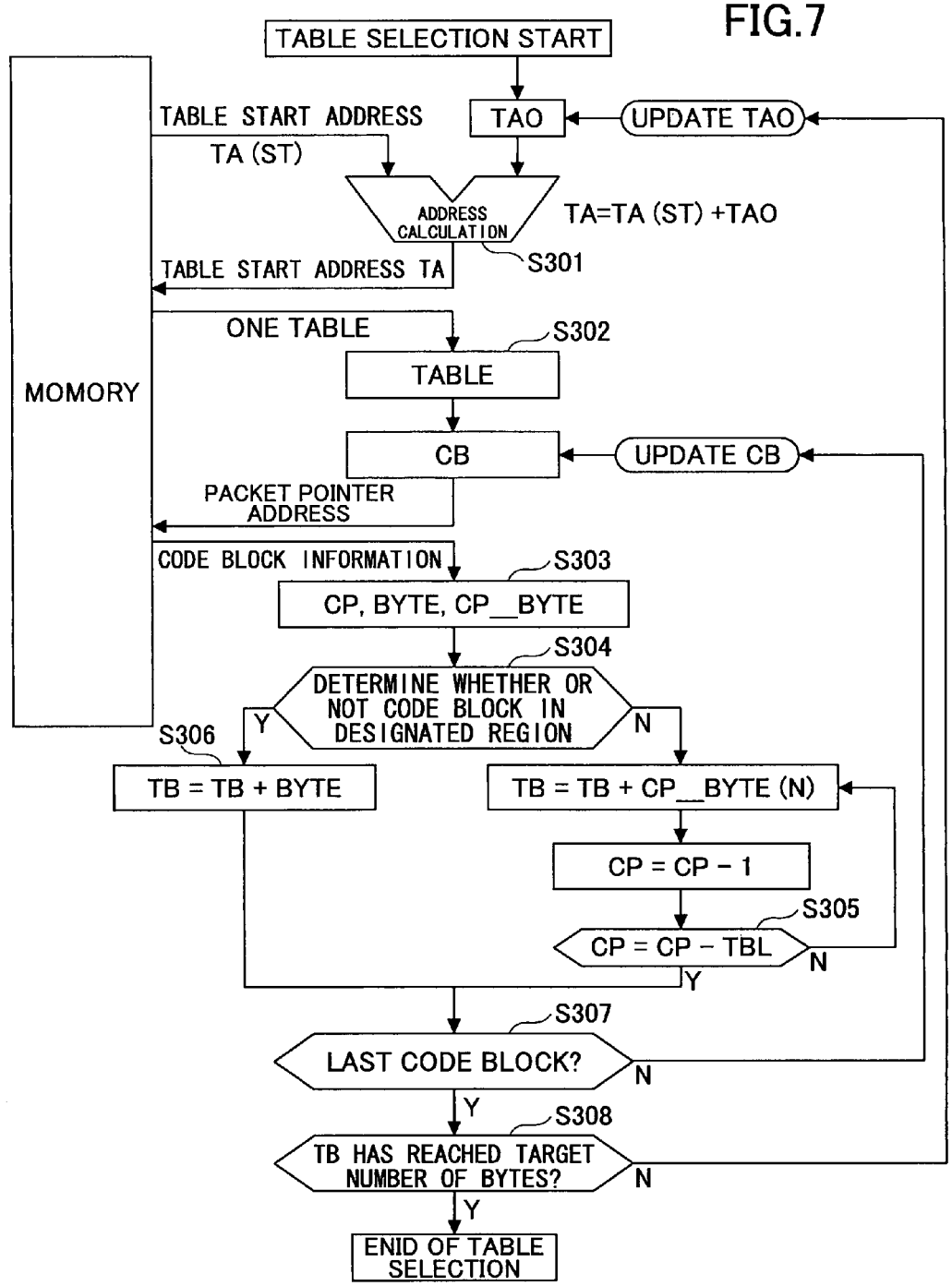
FIG. 7 shows an example of truncation table selection according to the embodiment of the present invention for when a designated region is given.

FIG. 7 shows an example of truncation table selection according to the embodiment of the present invention for when the designated region is given.

When a truncation table is selected, a value obtained from adding a table address offset (TAO) to a table start address TA(ST) in the memory is regarded as a table address (TA). That is, TA=TA(ST)+TAO (Step S301).

The table address offset TAO represents an offset value for each table from the table start address TA(ST).

Based on the table address TA, a table (TBL) is read from the memory, and, is recorded in a register (Step S302).

Next, based on a packet pointer address of the code block (CB), the packet pointer of the code block is read from the memory, the code block information (the number CP of coding passes, the code amount BYTE, and the code amount CP_BYTE(N) for each coding pass) of the packet pointer is thus extracted (Step S303).

When the code block is one not included in the designated region (No in Step S304), the value of the truncation table (TBL) is subtracted from the number CP of coding passes, and the subtraction result is regarded as the number of coding passes after the rate control. That is, CP=CP−TBL (Step S305).

Further, based on the code amount information (CP_BYTE (N)) of each coding pass, the code amount is calculated from the most significant coding pass through the coding pass left after the subtraction, i.e., CP=CP−TBL, i.e., TB=TB+CP_BYTE(N) and CP=CP−1 are repeated until CP=CP−TBL (Step S305). The calculation result is then regarded as the code amount after the rate control.

On the other hand, when the code block is one included in the designated region (Yes in Step S304), the subtraction processing is omitted, and the original code amount (BYTE) is regarded as it is as the code amount after the rate control, i.e., TB=TB+BYTE (Step S306).

Thus, the calculation is carried out for the code blocks of all the components, resolution levels and sub-bands (Step S307), and the resulting total code amount (TB) is compared with the target code amount (Step S308). Then, when the resulting total code amount exceeds the target (No in Step S308), a larger truncation table in its value is selected ('update TAO' through Step S302)), while, when the resulting code amount is less than the target (No in Step S308), a smaller truncation table in its value is selected (update TAO).

The truncation table is disposed in the order of the table values thereof. As a result, as the table address offset TAO increases, the thus-obtained table value increases accordingly. First, the table selection is carried out in such a manner that the table address offset increases gradually (wherein a changing amount is fixed each time), to obtain the total code amount each time. Then, when the thus-obtained total code amount becomes less than the target amount, the table address offset changing amount is made half and, the table selection is then carried out in such a manner that the table address offset decreases with the thus-obtained new table address offset changing amount.

Thus, the table address offset is updated, a seek range is reduced gradually, and finally, a target table is reached. When the target code amount is not reached even with the largest truncation table, the processing is finished. Then, in this case, the largest table is regarded as the target table, and the current code amount is regarded as the target code amount (Steps S307 and S308).

Figure 8:
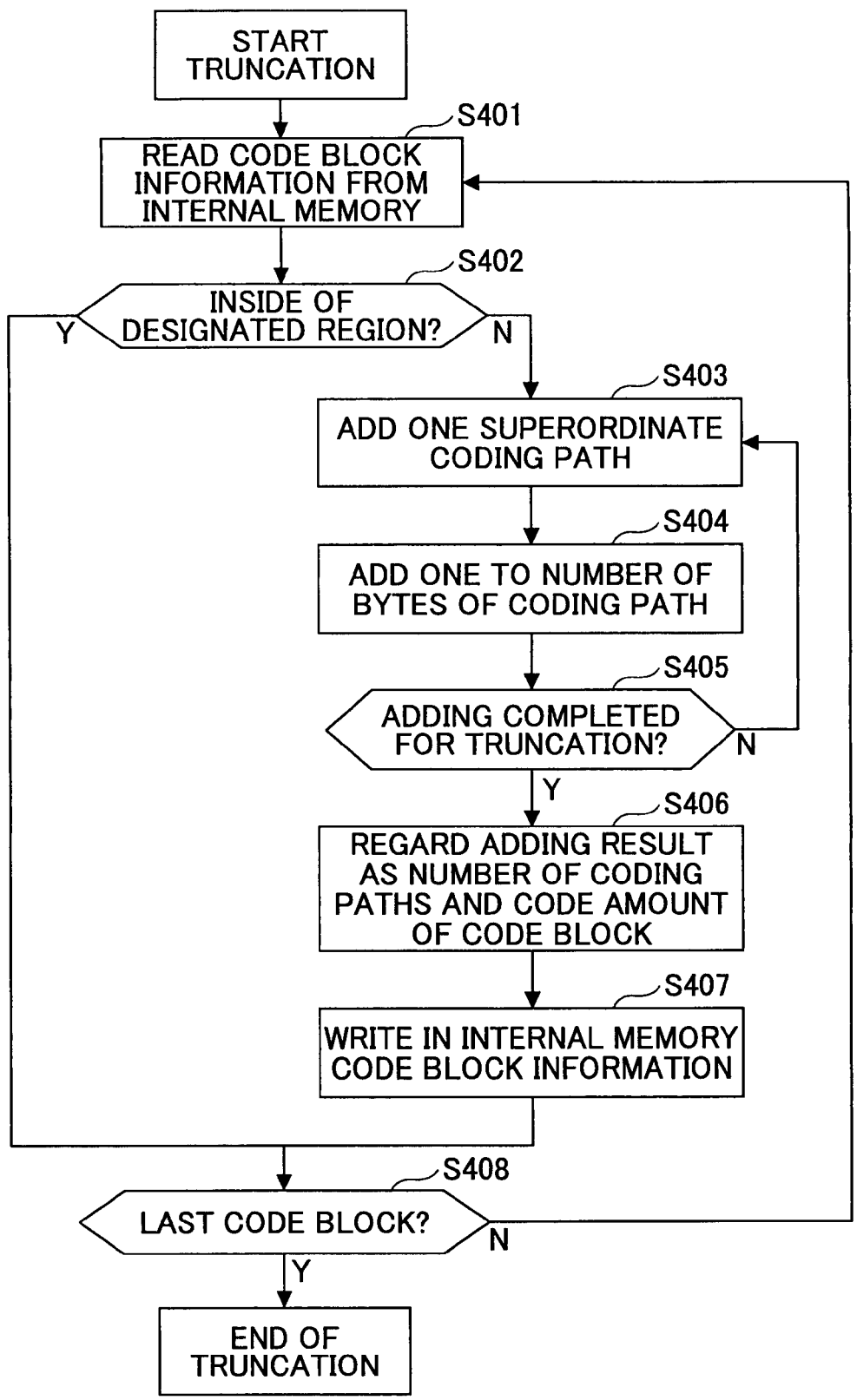
FIG. 8 shows an example of truncation for when a designated region is given.
Figure 9:
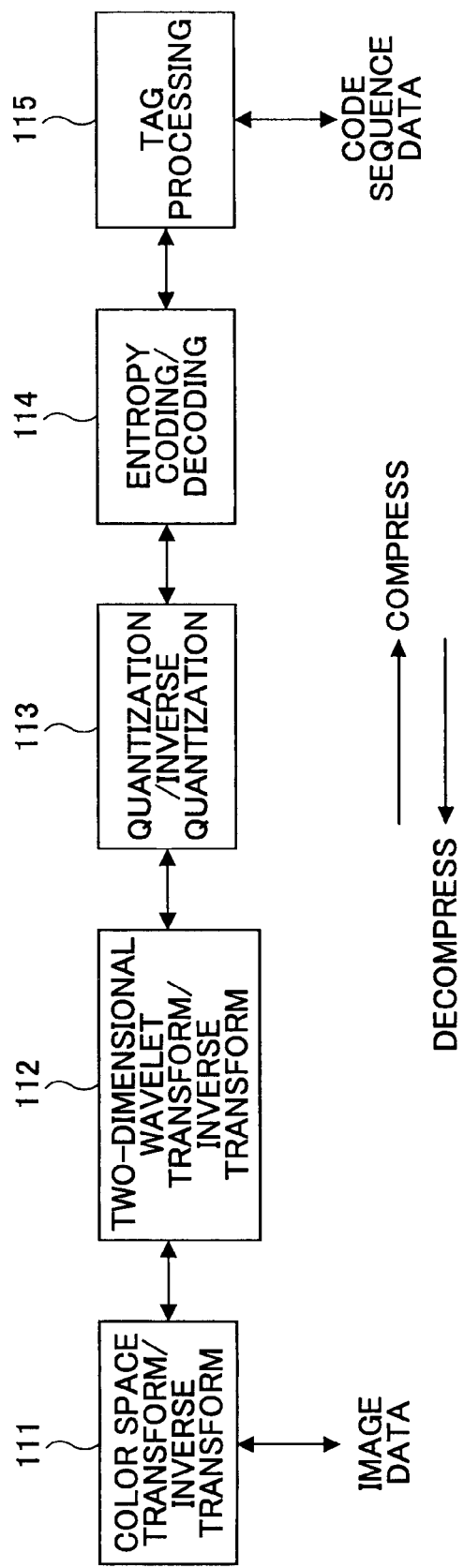
FIG. 9 shows a functional block diagram for illustrating a basic of JPEG2000 algorithm.
Figure 10:
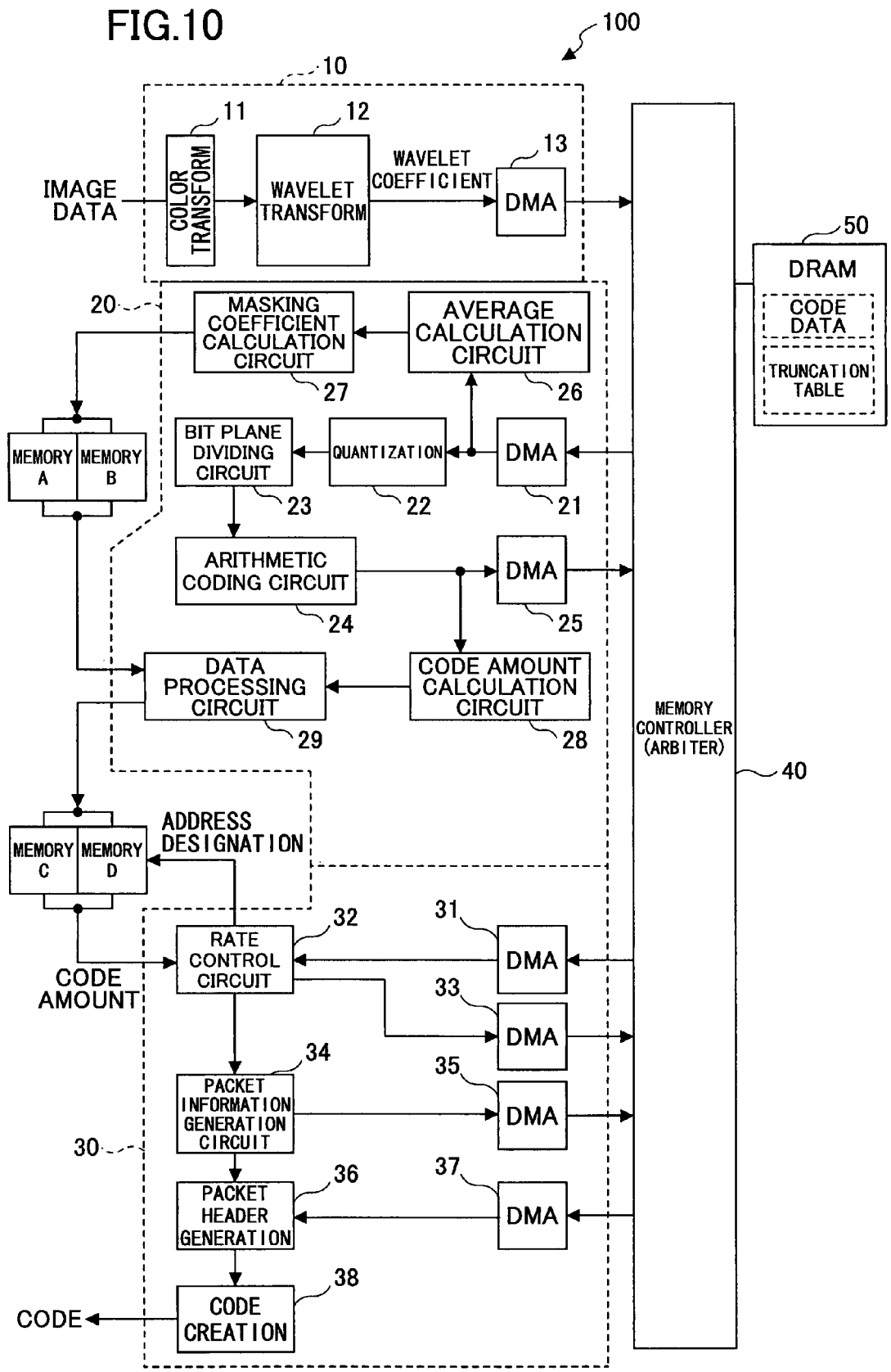
FIG. 10 shows a configuration of an image compressing apparatus disclosed in Patent documents 2 and 3.
Figure 11:
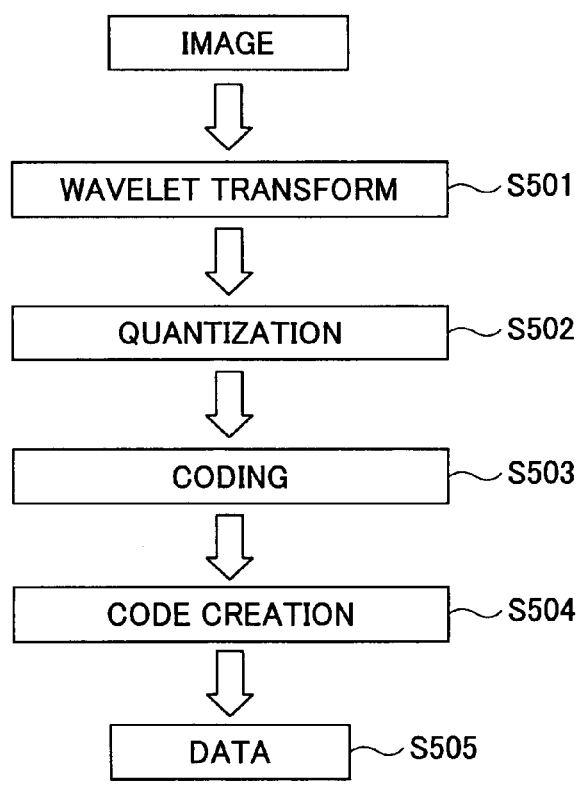
FIG. 11 shows a flow of JPEG2000 coding processing in the related art.
Figure 12:
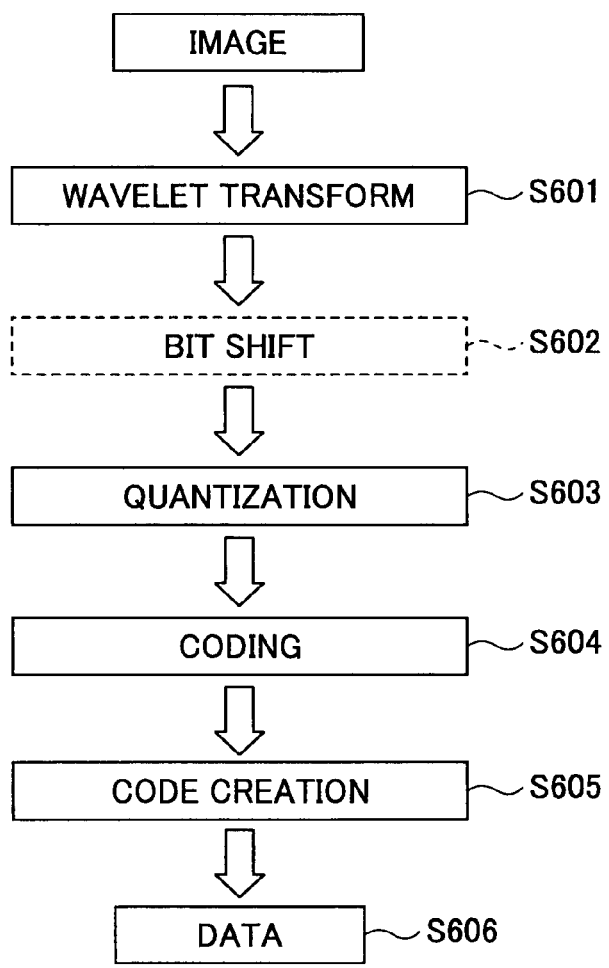
FIG. 12 shows a flow of processing including ROI processing upon coding.

FIG. 8 shows an example of truncation according to the embodiment of the present invention for truncation for when the designated region is given.

First, a packet pointer is read for each code block, and thus, necessary information such as the number of coding passes, the code amount (the number of bytes) and so forth, are obtained in Step S401. For the code block included in the designated region (Yes in Step S402), the truncation amount is made zero, and the code block information is kept unchanged accordingly. Accordingly, writing to the memory is not required, and thus, a subsequent code block is then processed (No in Step S408).

For the code block not included in the designated region (No in Step S402), coding passes are truncated according to the truncation table value, then the code amount of the coding passes after the truncation is calculated (Steps S403 through S406), and then, writing of the packet pointer to the memory is carried out for updating the code block information accordingly (Step S407). After all the code blocks are thus processed (Yes in Step S408), the truncation is finished.

Thus, in the example according to the embodiment of the present invention described with reference to FIGS. 4A, 5 through 8, data truncation for the code blocks inside of the designated region is avoided. Thus, more data (information) is held for the code blocks included in the designated region in comparison to the code blocks outside of the designated region. As a result, the image quality is improved in the designated region more than that in the other region, and thus, it is possible to obtain an effect visually close to that obtained from the ROI function of the bit shift method. Thus, it is possible to achieve the function analogous to the ROI function.

In further another example according to the embodiment of the present invention, for when a plurality of frames are successively processed, the above-described rate control, described above with reference to FIGS. 4A, 5 through 8, in which code blocks for which no truncation is carried out are determined from the previously designated spatial coordinate position, is carried out only for a specified frame(s), while the conventional rate control is carried out on the other frames. FIG. 4B shows a flow of the processing. FIG. 4B is the same as FIG. 4A, except that Step S202A is inserted. As a result, for the designated frame (Yes in Step S202A) and also for the designated region included therein (Yes in Step S203), the truncation is omitted, while, for the other region of the frame (No in Step S203) and for the other frames (No in Step S202A), the truncation is carried out (Step S204). Thus, it is possible to improve the image quality for the specific position of the specific frame(s).

It is noted that JPEG2000 defines image data compressing/decompressing ways, and, a hardware resource is required for actually carrying out compressing or decompressing image data according to these ways. Specifically, the processing is carried out by a computer as the hardware resource, such as that as shown in FIG. 14, as a result of the computer executing a corresponding computer program.

Figure 14:
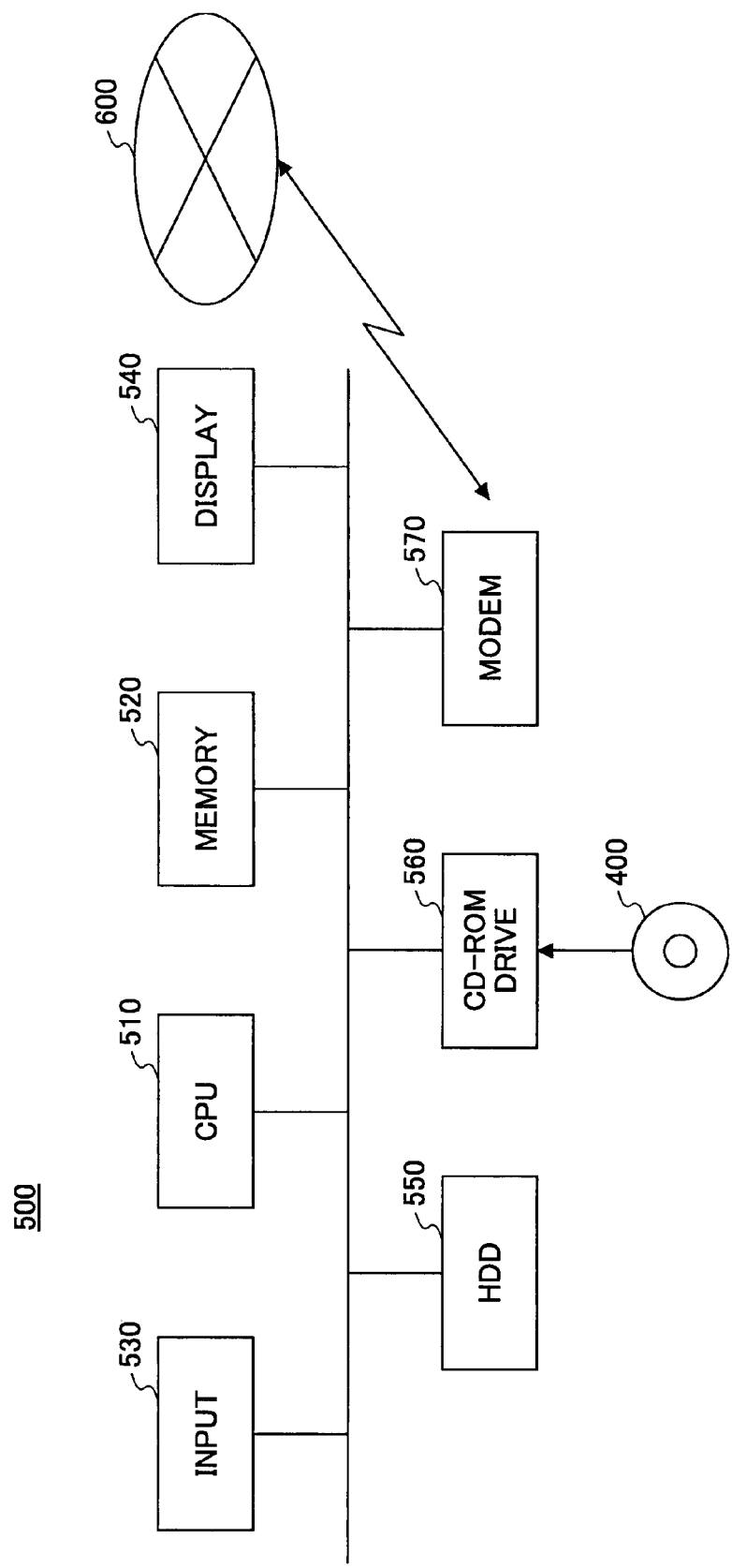
FIG. 14 shows block diagram for illustrating an example of a hardware configuration of a computer for carrying out image compressing/decompressing processing according to an embodiment of the present invention.

For example, as shown in FIG. 14, the computer 500 includes a CPU 510 for carrying out various operations by executing instructions written in the program; an input part 530 such as a keyboard, a mouse, and so forth, for the user to input operation contents or data; a display part 540 such as a CRT, a liquid crystal display device or such, for displaying, to the user, a processing progress, a processing result or such of the CPU 510; a memory 520 such as a ROM, a RAM and so forth, for storing the program to be executed by the CPU 510, or to be used as a work area of the CPU 510; a hard disk drive 550 for storing the program, data and so forth; a CD-ROM drive 560 for loading the program or data from the outside with the use of a CD-ROM 400 as an information recording medium; and a modem 570 for downloading the program or such, from an external server via a communication network 600 such as the Intent, LAN or such.

The computer program for image processing, i.e., for image data compressing/decompressing according to JPEG2000 manner, especially configured to carry out the operation according to the embodiment of the present invention described above with reference to FIGS. 1 through 8, may be installed in a storage device such as the above-mentioned hard disk drive 550 of the computer 500, a basic architecture configured by the CPU 510 and the memory 520 of the computer 500 interprets the computer program, carries out the JPEG2000 image compressing processing on an input image, or, decompresses image data compressed according to the JPEG2000 manner.

The computer program for image processing according to the embodiment of the present invention may be commercially circulated by means of various recording media, i.e., a hard disk drive such as the above-mentioned hard disk drive 550, various hand-held optical disks such as the above-mentioned CD-ROM 400, recording information optically and/or magnetically, flexible disks, or the communication network 600 such as the Internet.

The present invention is not limited to the above-described embodiments, and variations and modifications may be made without departing from the basic concept of the present invention claimed below.

The present application is based on Japanese Priority Application No. 2006-070526, filed on Mar. 15, 2006, the entire contents of which are hereby incorporated herein by reference.

What is claimed is:

1. An image compressing apparatus carrying out code amount control upon JPEG2000 coding, in which a number of coding passes and a code amount for each code block generated by a MQ (arithmetic) coder are input, and a number of coding passes and a code amount are determined based on a first code amount control standard and a second code amount control standard given for each code block, comprising:

a part using, for a specific code block in a designated region, the second code amount control standard to determine the number of coding passes and the code amount, and using, for code blocks not in the designated region, the first code amount control standard to determine the number of coding passes and the code amount; and wherein, according to a truncation table selected from among a plurality of truncation tables, the truncation table describes a truncation amount for each color component and for each sub-band of each level, truncation is carried out, and a total code amount is calculated;

each time the calculated total code amount is compared with a target code amount; and selection of a truncation table is repeated until the calculated total code amount reaches the target code amount; and wherein the apparatus is configured to select a truncation table from a memory based on a table address, and, for each code block not in the designated region, a truncation table value is subtracted from a corresponding coding passes number, and for the code block in the designated region, a truncation table value is not subtracted from a coding passes number, a coding amount is obtained for the obtained coding passes number, the process is repeated for all the code blocks to obtain the total code amount, it is determined whether the total code amount reaches the target code amount, the process starting from selection of a truncation table is repeated when the total code amount does not reach the target code amount, and the currently selected truncation table is finally selected when the total code amount reaches the target code amount.

2. The image compressing apparatus as claimed in claim 1, wherein: the first code amount control standard is such that the predetermined number of coding passes to discard is used as it is for each coding block.

3. The image compressing apparatus as claimed in claim 1, wherein: the second code amount control standard is such that the number of coding passes to discard is zero, and thus, no code generated by the MQ coder is discarded for a code block belonging to a designated spatial region.

4. The image compressing apparatus as claimed in claim 1, wherein: the code blocks to use the second code amount control standard are determined by a predetermined spatial coordinate position.

5. The image compressing apparatus as claimed in claim 4, wherein: the code blocks to use the second code amount control standard are determined by a frame to process.

6. An image compressing method for carrying out code amount control upon JPEG2000 coding, in which a number of coding passes and a code amount for each code block generated by a MQ (arithmetic) coder are input, and a number of coding passes and a code amount are determined based on a first code amount control standard and a second code amount control standard given for each code block; comprising the steps of:
  a) using, for a specific code block in a designated region, the second code amount control standard to determine the number of coding passes and the code amount; and
  b) using, for code blocks not in the designated region, the first code amount control standard to determine the number of coding passes and the code amount; and
  wherein, according to a truncation table selected from among a plurality of truncation tables, the truncation table describing a truncation amount for each color component and for each sub-band of each level, truncation is carried out, and a total code amount is calculated;
  each time the calculated total code amount is compared with a target code amount; and
  selection of a truncation table is repeated until the calculated total code amount reaches the target code amount; and
  wherein the method includes the step of selecting a truncation table from a memory based on a table address, and wherein, for each code block not in the designated region, a truncation table value is subtracted from a corresponding coding passes number, and for the code block in the designated region, a truncation table value is not subtracted from a coding passes number, a coding amount is obtained for the obtained coding passes number, the process is repeated for all the code blocks to obtain the total code amount, it is determined whether the total code amount reaches the target code amount, the process starting from selection of a truncation table is repeated when the total code amount does not reach the target code amount, and the currently selected truncation table is finally selected when the total code amount reaches the target code amount.

7. The image compressing method as claimed in claim 6, wherein: the first code amount control standard is such that the predetermined number of coding passes to discard is used as it is for each coding block.

8. The image compressing method as claimed in claim 6, wherein: the second code amount control standard is such that the number of coding passes to discard is zero, and thus, no code generated by the MQ coder is discarded for a code block belonging to a designated spatial region.

9. The image compressing method as claimed in claim 6, wherein: the code blocks to use the second code amount control standard are determined by a predetermined spatial coordinate position.

10. The image compressing method as claimed in claim 9, wherein: the code blocks to use the second code amount control standard are determined by a frame to process.

11. A non-transitory computer-readable medium having embodied therein a program for image compressing comprising instructions to cause a computer to carry out code amount control upon JPEG2000 coding, in which a number of coding passes and a code amount for each code block generated by a MQ (arithmetic) coder are input, and a number of coding passes and a code amount are determined based on a first code amount control standard and a second code amount control standard given for each code block, said program further comprising instructions to cause the computer to:
  use, for a specific code block in a designated region, the second code amount control standard to determine the number of coding passes and the code amount; and
  use, for code blocks not in the designated region, the first code amount control standard to determine the number of coding passes and the code amount; and
  wherein, according to a truncation table selected from among a plurality of truncation tables, the truncation table describing a truncation amount for each color component and for each sub-band of each level, truncation is carried out, and a total code amount is calculated;
  each time the calculated total code amount is compared with a target code amount; and
  selection of a truncation table is repeated until the calculated total code amount reaches the target code amount; and
  wherein said program further comprises instructions to cause the computer to select a truncation table from a memory based on a table address, and wherein, for each code block not in the designated region, a truncation table value is subtracted from a corresponding coding passes number, and for the code block in the designated region, a truncation table value is not subtracted from a coding passes number, a coding amount is obtained for the obtained coding passes number, the process is repeated for all the code blocks to obtain the total code amount, it is determined whether the total code amount reaches the target code amount, the process starting from selection of a truncation table is repeated when the total code amount does not reach the target code amount, and the currently selected truncation table is finally selected when the total code amount reaches the target code amount.

* * * * *